United States Patent [19]
Lisak et al.

[11] Patent Number: 5,165,775
[45] Date of Patent: Nov. 24, 1992

[54] HEADLAMP ADJUSTER MECHANISM WITH SLIDE-ON CAP/SNAP FIT

[75] Inventors: Stephen P. Lisak; Larry L. Young, both of Arab, Ala.

[73] Assignee: Textron, Inc., Providence, R.I.

[21] Appl. No.: 788,563

[22] Filed: Nov. 6, 1991

[51] Int. Cl.⁵ ............................................. F21V 3/18
[52] U.S. Cl. ................................... 362/66; 362/273; 362/424
[58] Field of Search ..................... 362/61, 66, 69, 424, 362/270, 269, 418, 427, 428, 425, 419

[56] References Cited

U.S. PATENT DOCUMENTS

| | | | |
|---|---|---|---|
| 4,665,469 | 5/1987 | Furfari et al. | 362/66 |
| 4,674,018 | 1/1987 | Ryder et al. | 362/424 |
| 4,703,399 | 10/1987 | Van Duyn et al. | 362/66 |
| 4,713,739 | 12/1987 | Ryder et al. | 362/424 |
| 4,893,219 | 1/1990 | Lisak | 362/66 |
| 5,079,676 | 1/1992 | Lisak | 362/61 |

Primary Examiner—James C. Yeung
Attorney, Agent, or Firm—Trexler, Bushnell, Giangiorgi & Blackstone, Ltd.

[57] ABSTRACT

A headlamp adjuster mechanism, constructed according to the teachings of the present invention, for use with a headlamp for controlling movement thereof comprises a housing. Gear means is disposed within the housing, and an adjusting member is connected to the gear means for movement in response to rotation of the gear means. The gear means is operatively connected to the headlamp for attaining controlled positioning thereof and for providing prevailing torque for the mechanism to prevent inadvertent movement thereof. The housing comprises a main body portion and a cap for slidable engagement with the main body portion. The body and the cap have interengagable locking means for providing a snap-type interference fit therebetween to maintain the housing components in assembly.

16 Claims, 2 Drawing Sheets

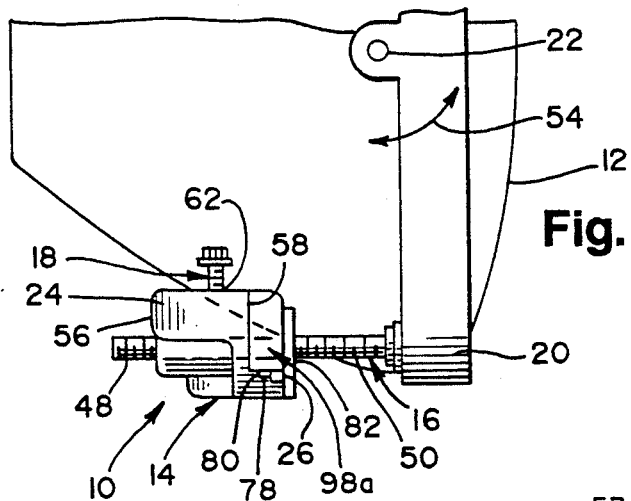
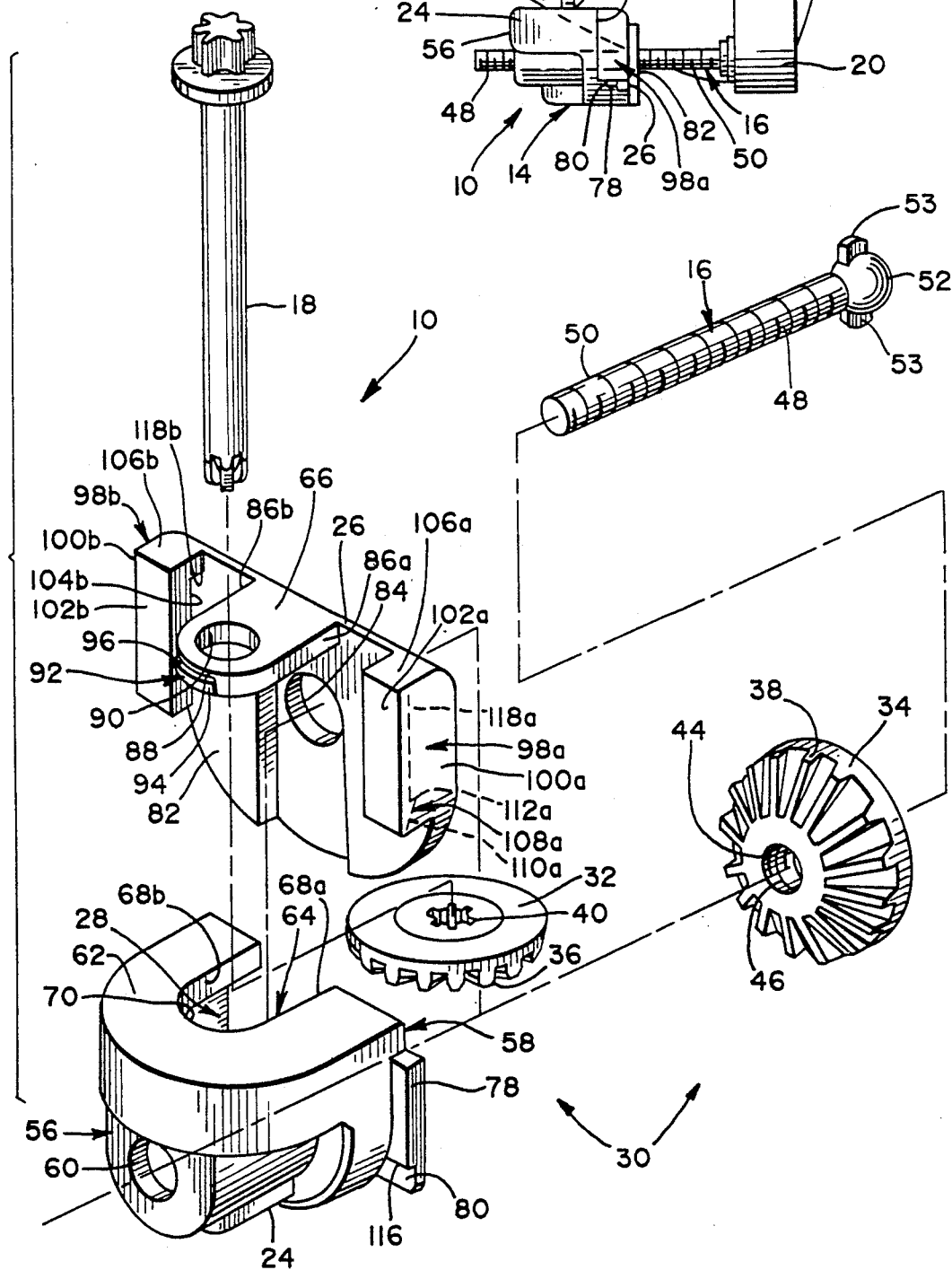

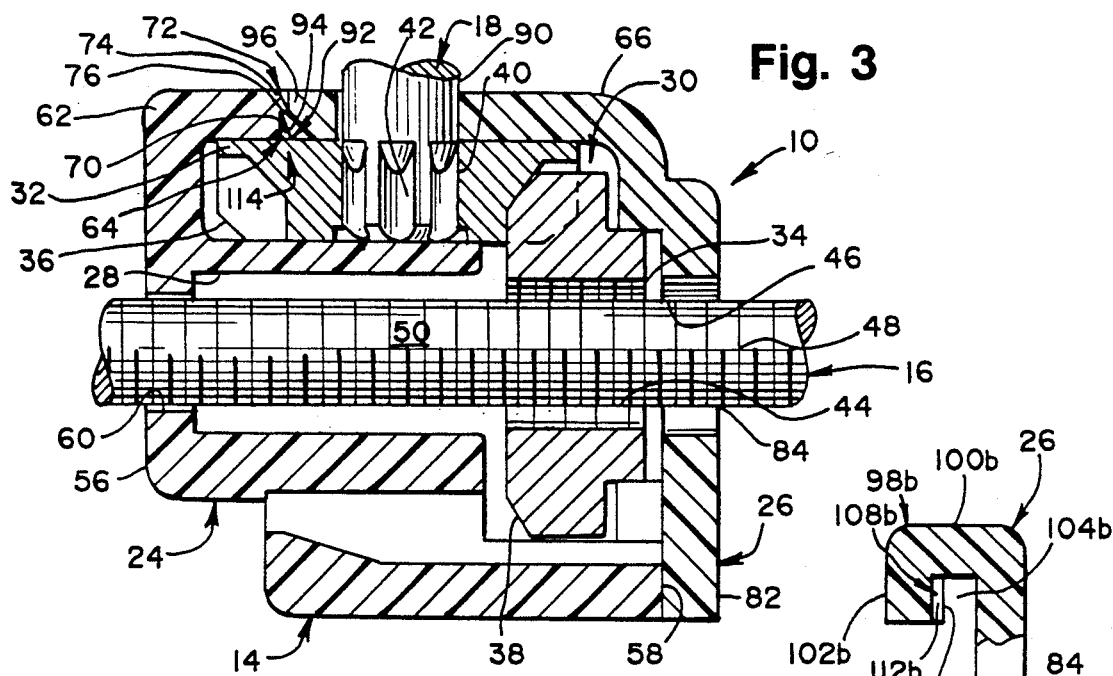
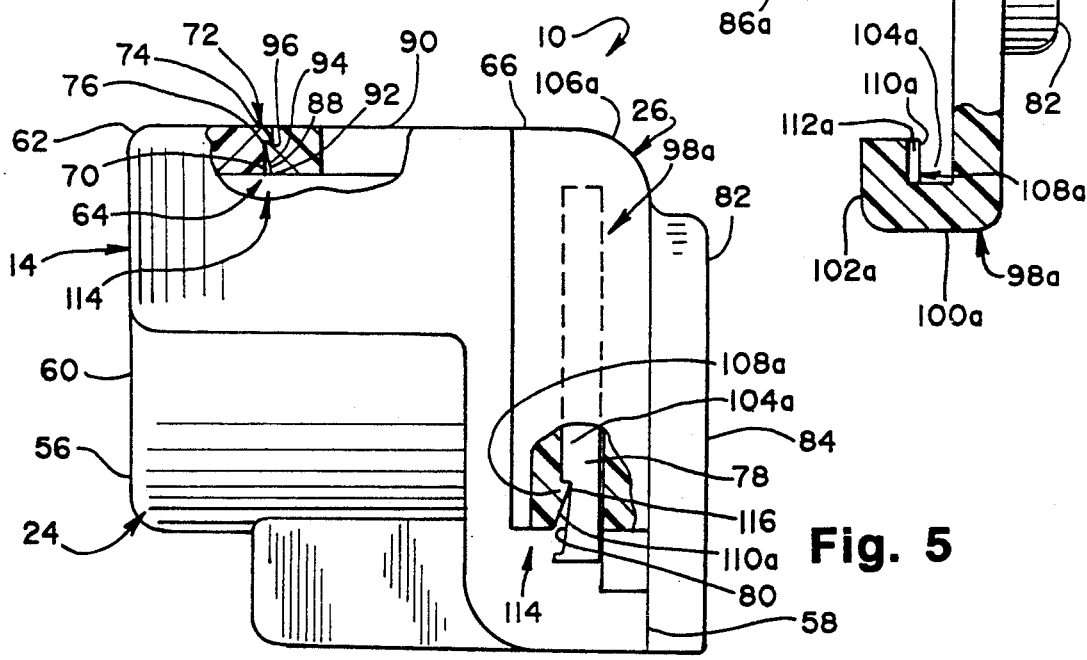

HEADLAMP ADJUSTER MECHANISM WITH SLIDE-ON CAP/SNAP FIT

BACKGROUND AND SUMMARY OF THE INVENTION

The present invention generally relates to a new and useful construction for a headlamp adjuster mechanism, and more specifically relates to a unique construction of a housing for retaining elements, or portions thereof, of the headlamp adjuster mechanism.

The construction and function of headlamp adjuster mechanisms are well known to those having ordinary skill in the relevant art. Generally, the headlamp adjuster mechanism comprises some type of gear means operatively connected to an adjusting member. Operation of the gear means causes the adjusting member to move, thereby controlling the positioning of the headlamp.

The gear means and at least a portion of the adjusting member are commonly disposed within a housing for protecting those elements of the headlamp adjuster mechanism from the possibly adverse effects of an ambient environment, viz., dirt and moisture. The internal construction of the housing also facilitates operation of the adjuster mechanism.

There are a wide variety of different housing constructions present in the prior art. A typical example of such a housing is disclosed in the patent to Ryder et al., U.S. Pat. No. 4,674,018, assigned to the assignee of the present invention. Therein is disclosed a housing comprising a body and a cap. During assembly of the adjuster mechanism, the operative elements thereof are placed within a cavity in the body through an open end thereof. The open end of the body is then covered and closed by placement of the cap thereon. The cap is ultrasonically welded to the body in order to firmly complete the housing.

Yet another housing construction for headlamp adjuster mechanisms is presented in the patent to Furfari et al., U.S. Pat. No. 4,465,469. This construction is provided with hinge means joining the body to the cap. The hinge means provides access to the operative elements of the adjuster mechanism disposed within the housing. In order to insure a secure fit between the body and the cap, pins are provided for locking those housing elements together.

The headlamp adjuster mechanism of the present invention provides a novel improvement over the mechanisms of the prior art. Specifically, the present invention provides a uniquely constructed housing for containing the operative elements of the adjuster mechanism.

OBJECTS AND SUMMARY OF THE INVENTION

A general object of the present invention is to provide a uniquely constructed headlamp adjuster mechanism.

A more specific object of the invention is to provide a headlamp adjuster mechanism having a uniquely constructed housing.

Another object of the present invention is to provide a headlamp adjuster mechanism which is less expensive to manufacture than other, currently available adjusters.

An additional object of the invention is to provide a headlamp adjuster mechanism which is less complex than other presently available adjusters.

A further object of the present invention is to provide a headlamp adjuster mechanism which does not require ultrasonic welding or other means for permanently securing a cap to the main body portion of the housing.

Another object of the invention is to provide a headlamp adjuster mechanism having a cap which slides onto the body and snaps into locking engagement therewith.

A headlamp adjuster mechanism, constructed according to the teachings of the present invention, for use with a headlamp for controlling movement thereof comprises a housing, with gear means disposed within the housing, and an adjusting member connected to the gear means for movement in response to rotation of the gear means. The gear means is thus operatively connected to the headlamp for attaining controlled positioning thereof and for providing prevailing torque for the mechanism to prevent inadvertent movement thereof. The housing comprises a main body portion and a cap for slidable engagement with the main body portion. The body and the cap have interengagable locking means for providing a snap-type interference fit therebetween to maintain the housing components in assembly without the need to ultrasonically weld or otherwise secure the cap to the housing.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a schematic side elevational view of a headlamp adjuster mechanism, constructed according to the teachings of the present invention, operatively attached to an automobile headlamp assembly for positioning the same;

FIG. 2 is an exploded perspective view of the adjuster mechanism of the present invention;

FIG. 3 is a sectioned side elevational view of the adjuster mechanism of FIG. 2 illustrating the construction thereof;

FIG. 4 is a top plan view of a cap comprising a housing of the adjuster mechanism of FIG. 3 with portions thereof broken away revealing locking means; and FIG. 5 is a side elevational view of the adjuster mechanism of FIG. 3 with portions thereof broken away revealing interaction between the locking means on the body and the locking means on the cap.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to the specific embodiments as illustrated and described herein.

Referring initially to FIG. 1, a headlamp adjuster mechanism 10 for positively positioning a headlamp 12 is shown. The adjuster mechanism 10 includes a housing 14 and has an adjusting member 16 movably extending through the housing 14. The mechanism 10 also has a drive shaft 18 which extends from the housing 14 at a location substantially perpendicular to the adjusting member 16, which drive shaft is connected to gear means within the housing such that rotation of the drive shaft 18 will cause the adjusting member 16 to move linearly, as discussed hereinafter.

The adjuster mechanism 10 is similar in construction and operation to the like kind apparatus disclosed in the U.S. patent application of Lisak, Ser. No. 07/517,232. That application is assigned to the assignee of the present invention, and the disclosure of that application is incorporated herein by this reference.

The adjusting member 16 is connected to a headlamp housing 20 which surrounds at least a portion of the headlamp 12. The headlamp housing 20 may be of various forms, and includes a pivot bearing 22 about which the housing 20 may pivot. In this way, the movement of the adjusting member 16, due to the application of a torque to the drive shaft 18, affects the vertical positioning of the headlamp 12. Additional adjuster mechanisms 10 can be provided to affect the horizontal positioning of the headlamp 12.

The elements of the adjuster mechanism 10 are illustrated in FIG. 2. The housing 14 is of a unique construction, and is preferably composed of molded plastic components, although other materials are possible, as will become more clear hereinafter. As shown, the housing 14 generally comprises a main body portion 24 and a cap 26. The body 24 has a main cavity 28 for accepting other elements of the mechanism 10. The cavity 28 is closable by the cap 26, as will be discussed later, to complete the construction of the mechanism 10 and to protect the internal components from the possibly adverse effects of the ambient environment, such as dirt and moisture.

The cavity 28 is of sufficient dimensions, and is specifically configured to accept gear means 30. The gear means 30 may be of any of a number of well known designs, but as illustrated generally comprises a drive gear 32 and an adjusting gear 34. The gears 32 and 34 are constructed for cooperating together, and are of the bevel-meshed type, well known in the relevant art.

The drive gear 32 itself has a plurality of teeth 36 which mesh with complementary teeth 38 on the adjusting gear 34. The cavity 28 has gear journaling bores, shoulders, and/or chambers 29 for journaling the gears 32 and 34 for rotation. The drive gear 32 and the adjusting gear 34 are journaled within the cavity 28 so that rotation of the drive gear 32 causes corresponding rotation of the adjusting gear 34.

The drive gear 32 has a centrally located aperture or socket 40 extending axially. The aperture or socket 40 accepts an end 42 on the drive shaft 18. The aperture 40 accordingly has a configuration complementary to the configuration of the received end for transmitting torque applied to the drive shaft 18 by an appropriate tool, not shown, to the drive gear 32. In this way, a torque applied to the drive shaft 18 will produce rotation of the gear means 30.

The adjusting gear 34 also has a centrally located aperture in the form of an internally threaded bore 44 extending latitudinally through the gear 34. The bore 44 is of dimensions sufficient to accept the adjusting member 16. Internal threads 46 are formed in the bore 44 and can be engaged with complementary threads 48 on the adjusting member 16. The adjusting member or screw 16 is fixed against rotation, such that when the gear means 30 rotates, the threads 46 and 48 interact in a known manner to move the adjusting member 16 linearly, thereby affecting the vertical positioning of the headlamp 12.

The adjusting member 16 may take on any of a number of different constructions. Generally, the adjusting member 16 has a threaded shank 50 and a ball-like end portion 52. The ball-shaped end portion 52 may be provided with a pair of ears 53 which are engaged with a mating structure (not shown) on the headlamp housing 20 to prevent rotation of the adjusting member 16. Thus, as the gear 34 rotates, the adjusting member 16 will move linearly, since it is precluded from rotation. The shank 50 has a length sufficient to move the headlamp housing 20 through an arc 54 sufficient to attain the desired range of movement. Preferably, the threads 48 are disposed along the entire length of the shank 50.

With the internal operative elements of the adjuster mechanism 10 thusly disclosed, the unique construction of the housing 14, or more specifically, of the main body portion 24 and the cap 26, will now be discussed. Referring initially to FIG. 2, certain aspects of the novel construction of the body 24 are illustrated. Specifically, the main body portion 24 has a substantially closed first end 56 and a substantially open second end 58. A substantially planar top portion 62 joins the first end 56 to the second end 58 along adjacent edges of each. The top portion 62 in the illustrated embodiment also includes a slot or cut-out portion 64. It is to be noted that the main body 24 and the cap 26 are preferably molded from a plastics material.

The first end 56 has an aperture 60 therein of dimensions sufficient to accept the threaded shank 50 of the adjusting member 16. The aperture 60 preferably has a configuration which complements a configuration on the threaded shank 50. While the aperture 60 and the threaded shank 30 are circular, said aperture and shank could be formed to mating non-circular configurations to prevent rotation of the adjusting member 16. If this were done, there would be no need for the ears 53 on the ball portion 52 of the adjusting screw 16. The second end 58 of the housing is opened which allows placement of the gear means 30 within the main body portion 24 during assembly of the mechanism 10.

The main body portion 24 has structures which complement corresponding structures on the cap 26, thereby facilitating their assembly to form the housing 14. Specifically, the top portion 62 has a cut-out portion 64 of dimensions sufficient for accepting a tongue portion 66 on the cap 26, as will be discussed further herein. The tongue portion 66 and groove 64 arrangement is used to facilitate molding of the respective components, as the placement of the tongue 66 on the cap 26 with its aperture for the drive shaft 18 reduces the side actions that are needed for the molds and correspondingly reduces the cost of the molds and the molding operation.

The cut-out or groove portion 64 extends from the second end 58 towards the first end 56. The cut-out portion 64 comprises two substantially parallel linear sections 68a and 68b joined at an end thereof opposite to the second end 58 by a substantially arcuate section 70.

As shown in FIG. 3 and FIG. 5, the arcuate section 70 has a tang 72 comprising a sloped portion 74 and a linear portion 76 which in effect define a shoulder. The sloped portion 74 inclines at an angle from the arcuate portion 70 towards the interior of the cut-out portion 64 a certain distance whereat the linear portion 76 extends away from the sloped portion 74 in a substantially perpendicular fashion to join the arcuate section 70. As will be detailed hereinafter, the tang 72 provides a shoulder for the snap fit assembly of the tongue 66 in the groove 64.

The main body 24 also has a pair of substantially planar flanges 78 which flank the second end 58, only one of which is viewable in FIG. 2. The flanges 78 extend away from the body 24 at the second end 58 in a substantially perpendicular fashion. A notch 80 is located on each of the flanges 78 on an end thereof opposite to the top portion 62. The notch 80, as will be discussed hereinbelow, also defines a shoulder portion and the respective notches are part of the snap fit structure that maintains the cap 26 and main body portion 24 in assembly.

The construction of the cap 26 is illustrated in FIG. 2 and FIG. 4. The configuration of the cap 26 allows it to cover and close the second end 58 of the body 24, thereby sealing the housing 14 from ambient contaminants. As shown, the cap 26 has a substantially planar face 82, and a tongue 66 which extends in a substantially perpendicular fashion from one side of the face 82, and is dimensioned to fit within and fill the groove or cut-out 64. An aperture 84, constructed substantially similarly to the aperture 60 in the first end 56 of the body 24, is disposed through the face 82 for accommodating the adjusting member 16.

The apertures 60 and 84 are located respectively on the body 24 and the cap 26 so that they are linearly aligned when the cap 26 is slidably engaged with the body 24, as will be discussed hereinafter. This allows the adjusting member 16 to enter the housing 14 through the hole 60, project through the housing 14, and exit the same through the hole 84. Thus, the gear means 30 can variably adjust the amount of the adjusting member 16 that is disposed between the housing 14 and the headlamp 12, thereby controlling the positioning of the headlamp 12.

The tongue 66 extends away from one side of the face 82 at a position substantially in alignment with the aperture 84. The tongue 66 has a configuration which complements the configuration of the cut-out portion 64. Specifically, the tongue 66 has a pair of substantially linear sections 86a and 86b extending substantially perpendicular away from the face 82. The linear sections 86a and 86b are joined at ends thereof opposite to the ends thereof joined to the face 82 by a substantially arcuate section 88.

The distance between the linear sections 86a and 86b is substantially equal to the distance between the linear sections 68a and 68b. Also, the arcs defined by and 88, respectively, are substantially similar in that they tend to mirror each other. Specifically as illustrated in the Figures, the arcuate section 70 is substantially concave, whereas the arcuate section 88 is substantially convex. This specific structure of the tongue 66 allows it to cover and close the cut-out portion 64, thereby completing the housing 14 when the cap 26 slidably engages the body 24.

A further aperture 90 is disposed through the tongue 66 within the boundaries defined by the linear sections 86a and 86b and the arcuate section 88. The aperture 90 is located so as to be in alignment with the aperture 40 in the drive gear 32 when the housing 14 is complete for accepting the received end 42 of the drive shaft 18. In this manner, the drive shaft 18 can extend from the aperture 40 in the drive gear 32 through the aperture 90 and to the exterior of the housing 14. This allows for operation of the gear means 30 from the exterior of the housing 14 where the drive shaft 18 is engagable by an appropriate tool, as is desired in many modern automobile constructions.

A projection 92 is disposed on the arcuate section 88 of the tongue 66, located so as to confront and engage the tang 72 when the housing 14 is assembled. Accordingly, the configuration of the projection 92 complements the configuration of the tang 72. Specifically, as illustrated in FIGS. 2 through 5, the projection 92 comprises a sloped portion 94 and a substantially linear portion 96. The sloped portion 94 extends away from the arcuate section 88 in an angular fashion for a certain distance whereat the linear portion 96 extends back to the arcuate section 88 in a substantially perpendicular fashion to provide a shoulder for engagement under the shoulder on the housing.

As shown in FIG. 2 and FIG. 4, two substantially reverse bend or L-shaped arms 98a and 98b extend from the face 82 on opposite sides of the aperture 84. The arms 98a and 98b comprise base portions 100a and 100b connected to and substantially perpendicularly extending away from the face 82, and leg portions 102a and 102b extending substantially perpendicularly away from an end of the base portions 100a and 100b, respectively, opposite to the end thereof connected to the face 82 towards the tongue 66.

The base portions 100a and 100b thusly define recesses or cavities 104a and 104b between the face 82 and the leg portions 102a and 102b. The recesses 104a and 104b are of dimensions sufficient for accepting the flanges 78 on the body 24. Accordingly, when the cap 26 slidably engages the body 24 to complete the housing 14, the flanges 78 are received in the recesses 104a and 104b, and are held in the assembled position by the snap fit structure, as will be further discussed hereinafter.

In a preferred construction, as shown in FIG. 2, the arms 98a and 98b have top portions 106a and 106b extending from the leg portions 102a and 102b to the face 82 proximate to the end thereof from which the tongue 66 extends. The thickness of the top portions 106a and 106b is approximately equal to the distance between a terminal end of the flanges 78 proximate to the top portion 62 of the body 24 and the top portion 62. Thus, when the cap 26 slidably engages the body 24, the top portions 106a and 106b function as positive stop members 118a and 118b, respectively, for positively locating the cap 26 with respect to the body 24.

Tabs or snap fit projections 108a and 108b are provided on the inwardly facing surfaces of the leg portions 102a and 102b. These tabs or snap fit projections 108a and 108b are constructed to engage the shoulders 116 provided by the notches 80 on the flanges 78. The tabs 108a and 108b comprise sloped portions 110a and 110b and linear portions 112a and 112b, respectively, which project from the leg portions 102a and 102b in a substantially perpendicular fashion towards the face 82. The length of the projection of the tabs 108a and 108b is substantially equal to the length of recess of the notch 80 on the flanges 78. In this manner, the tabs 108a and 108b lockingly reside within the notch 80 when the cap 26 slidably engages the body 24 to complete the housing 14.

With the structure of the housing 14 thusly disclosed, the construction of the adjuster mechanism 10 will now be discussed, further detailing the functionality of certain elements of the housing 14. Upon assembly, the gear means 30 is inserted through the open end 58 into the cavity 28 and journaled in the cavity 28 in the body 24 in proper relation for operation. The cap 26 is assembled with the body 24. Specifically, the cap 26 is aligned so that the aperture 90 on the tongue 66 can accept the drive shaft 18. Proper alignment of the cap 26 also assures that the flanges 78 on the body 24 are aligned for proper insertion into the recesses 104a and 104b of the cap 26. Additionally, the tongue 66 is aligned with the cut-out portion 64 for covering and closing the same. This alignment is illustrated generally in FIG. 2.

The body 24 and the cap 26 are moved together so that they slidably engage each other. First, the flanges 78 enter the recesses 104a and 104b so that a surface of the respective flanges 78 confronts and slidably engages the sloped portions 110a and 110b of the tabs 108a and 108b. The sloped portions 110a and 110b facilitate sliding of the surface of the flanges 78 under the tabs 108a and 108b.

As the body 24 and the cap 26 are progressively moved together, the flanges 78 slide under the tabs 108a and 108b until the projection 92 on the arcuate section 88 of the tongue 66 confronts and engages the arcuate section 70 of the cut-out portion 64. Specifically, the sloped portion 94 of the projection 92 engages the sloped portion 74 of the tang 72. The configurations of the sloped portions 74 and 94 facilitate further sliding engagement between the body 24 and the cap 26. As the body 24 and the cap 26 are further slid together, the sloped portions 74 and 94 slide against each other until the associated linear portions 76 and 96 are aligned. Additional sliding causes the projection 92 to snap firmly behind the tang 72 so that the linear portions 76 and 96 confront each other planarly. Thus, the projection 92 is locked behind the tang 72, and likewise, the tang 72 is locked behind the projection 92, as shown in FIG. 5.

Simultaneously, the flanges 78 slide along the leg portions 102a and 102b under the tabs 108a and 108b until the tabs 108a and 108b snap into the notches 80 on the flanges 78. The linear portions 112a and 112b of the tabs 108a and 108b, respectively, confront and engage a wall 116 of the notches 80 planarly. Thus, as illustrated in FIG. 5, the tabs 108a and 108b are locked within the notch 80.

The tang 72, the projection 92, the notches 80 and the tabs 108a and 108b form interengagable locking means 114 for providing a snap-type fit between the body 24 and the cap 26. Accordingly, the body 24 and the cap 26 are now firmly locked together. The housing 14 is complete, and the bore 44 in the adjusting gear 34 is in axial alignment with both the hole 60 in the first end 56 of the body 24 and the hole 84 in the face 82 of the cap 26. To complete the adjuster mechanism 10, the adjusting member 16 is threadibly inserted into the bore 44 through both apertures 60 and 84. Insertion of the adjusting member 16 further adds to the structural integrity of the housing 14. Also, the drive shaft 18 can now be disposed through the aperture 90 and engaged with the aperture 40 in the drive gear 32.

The adjuster mechanism 10 is now ready for connection to a headlamp housing 20 to affect the positioning thereof. It is to be noted that the unique sliding construction of the housing 14 eliminates the need to ultrasonic welding, or otherwise giving or affixing the body 24 and the cap 26 together. The housing 14 can thusly be formed of any suitable material, and is not limited to those materials predisposed to welding. Accordingly, the adjuster mechanism 10 is less complex and less expensive to manufacture than other presently available adjusters.

The illustrated embodiment utilizes a main body and cap arrangement wherein the cap includes tongue 66 received within a groove or cut-out 64 in the main body 24. The tongue 66 has the aperture 90 for receiving the drive shaft 18. This arrangement, as mentioned above, facilitates molding. It is envisioned, however, that where molding considerations are not critical, the tongue 66 and cut-out 64 may be eliminated. That is to say the upper surface 62 of the main body 24 could be continuous without the cut-out 64, requiring only the aperture 90 therein. Correspondingly, the cap 26 would not employ a tongue 66.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

We claim:

1. A headlamp adjuster mechanism comprising: a housing; gear means disposed within the housing; an adjusting member connected to the gear means for controlled movement thereof; the housing including a main body portion having an open end and providing a recess for reception and mounting of the gear means; a flange proximate a side of the open end; a cap member adapted to cover the open end; the cap member including an L-shaped portion defining a recess for receiving the flange on the main body portion; and snap fit means on the flange and the L-shaped portion of the cap which are engagable for retaining the cap on the main body portion of the housing.

2. A mechanism as defined in claim 1 wherein the snap fit means comprises a notch on the flange and a tab on the L-shaped body portion projecting into the recess; and the tab being insertable into the notch for retaining the cap on the main body portion.

3. A mechanism as defined in claim 2 wherein the tab has a sloped portion extending into the recess and a substantially linear portion depending from the sloped portion; the notch having a wall; the sloped portion for facilitating sliding engagement of the main body portion with the cap; and the linear portion and the wall lockingly engaging each other substantially planarly for retaining the cap on the main body portion.

4. A mechanism as defined in claim 1 wherein the L-shaped portion has a positive stop member engagable with the flange for positively locating the cap with respect to the main body portion.

5. A mechanism as defined in claim 1 wherein the main body portion and the cap each have a hole therethrough; the holes being of dimensions sufficient to accept the adjusting member; and the holes being axially aligned when the cap is retained on the main body portion of the housing.

6. A mechanism as defined in claim 1 wherein the L-shaped portion comprises a base portion extending from the cap and a leg portion extending from the base portion; the recess defined between the leg portion and the cap; the flange having a pre-determined thickness and the recess having dimensions approximately equal to the thickness of the flange.

7. A mechanism as defined in claim 1 wherein the main body portion has a cut-out portion and the cap has a tongue both for facilitating molding of the housing from a plastic material; the tongue having a configuration complementing a configuration of the cut-out portion so that the tongue can cover and close the cut-out portion; the snap fit means comprising a tang on the cut-out portion and a projection on the tongue; and the tang and the projection being lockingly engagable for retaining the cap on the main body portion of the housing.

8. A mechanism as defined in claim 7 wherein both the tang and the projection comprise a sloped portion and a substantially linear portion; the linear portions depending from the sloped portions; the sloped portions facilitating sliding engagement of the main body portion and the cap; and the linear portions lockingly engaging each other substantially planarly when the cap is retained on the main body portion.

9. A headlamp adjuster mechanism for use with a headlamp for controlling movement of said headlamp, the mechanism comprising: a housing; gear means disposed within the housing for facilitating controlling movement of said headlamp; an adjusting member connected to the gear means for movement responsive to rotation of said gear means; the adjusting member being operatively connected to the headlamp for attaining controlled positioning of said headlamp; the housing comprising a main body portion and a cap; the main body portion and the cap having complementary configurations for permitting sliding of the cap along the main body portion; the cap being slidably engagable with the main body portion for facilitating mating of the main body portion and the cap; and the main body portion and the cap having interengagable snap fit means operable responsive to proper sliding of said cap along said main body portion for retaining the cap on the main body portion in an assembled condition for completing the housing.

10. A housing for a headlamp adjuster mechanism having gear means disposed in the housing operatively connected within the housing to an adjusting member which is, in turn, operatively connected to a headlamp without the housing for attaining controlled positioning thereof, the housing comprising: a main body portion having an open end; a cap member adapted to cover the open end; an L-shaped portion defining a recess on the cap; a flange on the main body portion adjacent the open end; the recess of dimensions sufficient to accept the flange; and snap fit means on both the L-shaped portion and the flange which are lockingly engagable for retaining the cap on the main body portion of the housing.

11. A housing as defined in claim 10 wherein the snap fit means comprises a notch on the flange and a tab on the L-shaped body portion projecting into the recess; and the tab being insertable into the notch for retaining the cap on the main body portion.

12. A housing as defined in claim 11 wherein the tab has a sloped portion extending into the recess and a substantially linear portion depending from the sloped portion; the notch having a wall; the sloped portion for facilitating sliding engagement of the main body portion with the cap; and the linear portion and the wall lockingly engaging each other substantially planarly for retaining the cap on the main body portion.

13. A housing as defined in claim 10 wherein the L-shaped portion has a positive stop member engagable with the flange for positively locating the cap with respect to the main body portion.

14. A housing as defined in claim 10 wherein the L-shaped portion comprises a base portion extending from the cap and a leg portion extending from the base portion; the recess defined between the leg portion and the cap; the flange having a pre-determined thickness and the recess having dimensions approximately equal to the thickness of the flange.

15. A housing as defined in claim 10 wherein the main body portion has a cut-out portion and the cap has a tongue; the tongue having a configuration complementing a configuration of the cut-out portion so that the tongue can cover and close the cut-out portion; the snap fit means comprising a tang on the cut-out portion and a projection on the tongue; and the tang and the projection being lockingly engagable for retaining the cap on the main body portion of the housing.

16. A housing as defined in claim 15 wherein both the tang and the projection comprise a sloped portion and a substantially linear portion; the linear portions depending from the the sloped portions; the sloped portions facilitating sliding engagement of the main body portion and the cap; and the linear portions lockingly engaging each other substantially planarly when the cap is retained on the main body portion.

* * * * *

UNITED STATES PATENT AND TRADEMARK OFFICE
CERTIFICATE OF CORRECTION

PATENT NO. : 5,165,775

DATED : November 24, 1992

INVENTOR(S) : Stephen P. Lisak and Larry L. Young

It is certified that error appears in the above-identified patent and that said Letters Patent is hereby corrected as shown below:

Column 5, Line 51   " defined by and 88, "    should be — defined by the arcuate sections 70 and 88, —

Signed and Sealed this

Ninth Day of November, 1993

Attest:

BRUCE LEHMAN

Attesting Officer

Commissioner of Patents and Trademarks